(12) United States Patent
Denninger et al.

(10) Patent No.: US 12,014,584 B2
(45) Date of Patent: Jun. 18, 2024

(54) SYSTEMS AND METHODS FOR CONTACT CENTER CHANNEL MERGING

(71) Applicant: Ford Global Technologies, LLC, Dearborn, MI (US)

(72) Inventors: Matt Denninger, Royal Oak, MI (US); Devraj Singh, Dearborn, MI (US); Erin Colpaert, Dearborn, MI (US); Dinesh Kusuma, Dearborn, MI (US); David Brennan, Dearborn, MI (US); Deepak Singh, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 285 days.

(21) Appl. No.: 17/658,625

(22) Filed: Apr. 8, 2022

(65) Prior Publication Data
US 2023/0326259 A1    Oct. 12, 2023

(51) Int. Cl.
*G07C 5/00* (2006.01)
*G06V 20/62* (2022.01)

(52) U.S. Cl.
CPC ........... *G07C 5/008* (2013.01); *G06V 20/625* (2022.01)

(58) Field of Classification Search
CPC .............................. G07C 5/008; G06V 20/625
See application file for complete search history.

(56) References Cited

U.S. PATENT DOCUMENTS

| | | | |
|---|---|---|---|
| 8,942,369 B2 | 1/2015 | Tuchman et al. | |
| 10,210,472 B2 | 2/2019 | Matula et al. | |
| 10,469,664 B2 | 11/2019 | Pirat et al. | |
| 10,637,991 B1 | 4/2020 | Chan et al. | |
| 2015/0242944 A1 | 8/2015 | Willard et al. | |

OTHER PUBLICATIONS

Risto Oomi et al., In-Vehicle Emergency Call Services: eCall and Beyond, IEEE Communications Magazine, 01630-6804, 2017, 159-165.
Amazon Web Services, Any place, any time, any channel, How cloud technology can make call center experiences better for customers and more efficient for automotive brands and business, Automotive News, Nov. 18, 2020, 1-11.
Sushant Dhamnekar, Automotive Call Center Services Solution Using Amazon Connect by Wireless Car, Automotive Call center Services Solution Using Amazon Connect by Wireless Car, Aug. 23, 2021, 1-7.

*Primary Examiner* — Mathew Franklin Gordon
(74) *Attorney, Agent, or Firm* — Joseph Zane; Eversheds Sutherland (US) LLP

(57) ABSTRACT

The disclosure generally pertains to systems and methods for contact center channel merging. In an example method, a first inbound communication associated with a vehicle event may be received from a first vehicle component of a vehicle via a first communication medium, the first inbound communication including a first identifier. A second inbound communication associated with the vehicle event may be received from a second vehicle component of the vehicle via a second communication medium, the second inbound communication including a second identifier. It may be determined that a first time associated with the first inbound communication and a second time associated with the second inbound communication are within a predetermined threshold, and that the first identifier and the second identifier are both associated with the vehicle. At least one notification may be sent based in part on an aggregation of the first inbound communication and the second inbound communication.

20 Claims, 4 Drawing Sheets

SYSTEMS AND METHODS FOR CONTACT CENTER CHANNEL MERGING

BACKGROUND

Some vehicles may be configured to transmit communications to a contact center as a result of a vehicle event. In some circumstances, two or more separate components of a vehicle may transmit individual communications arising from the same vehicle event. If the individual communications are not all routed to the same party, resolution of the communications may be complicated, thus reducing efficiency at both ends of the communications (the contact center and the vehicle).

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
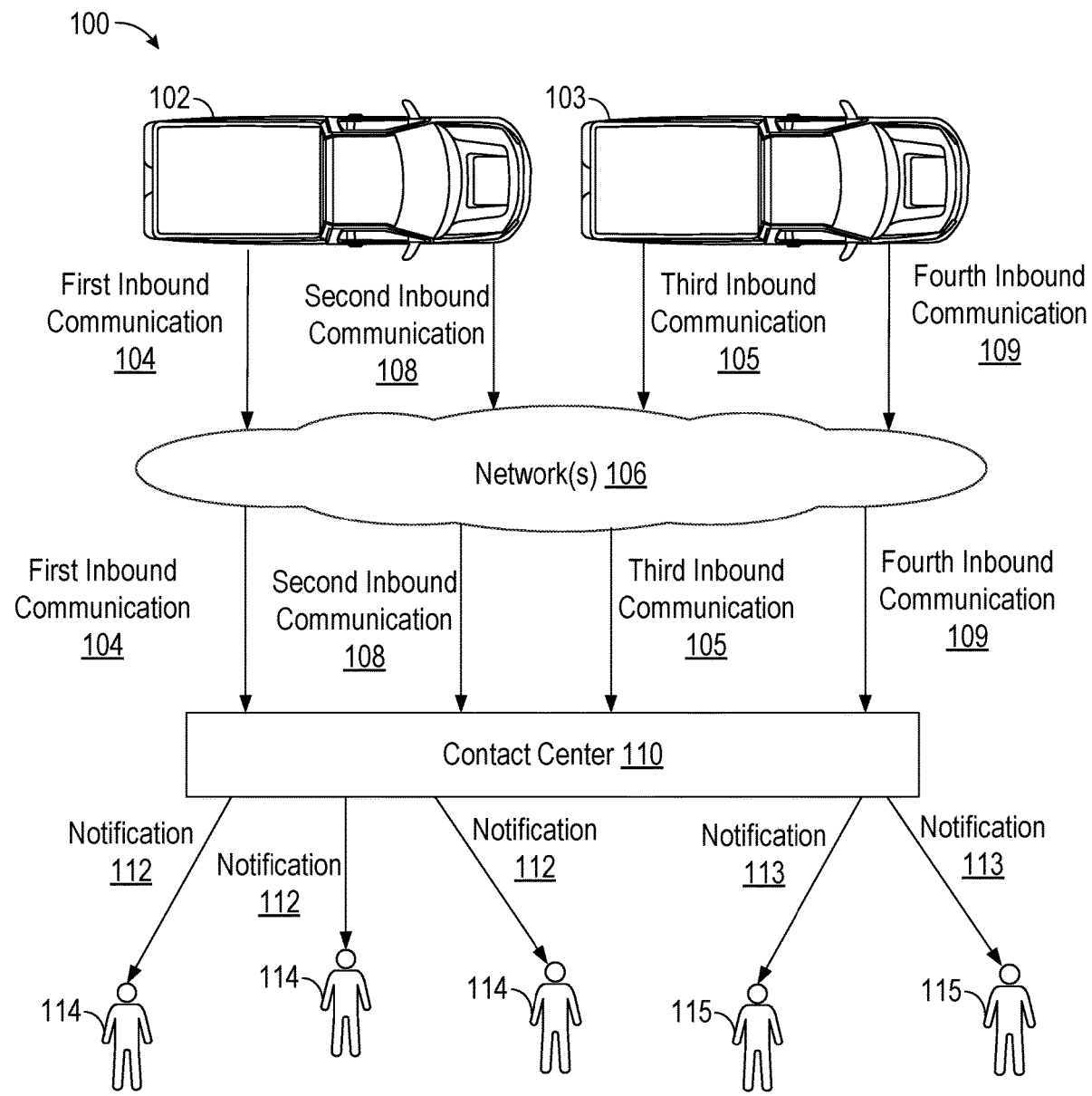
FIG. 1 illustrates an example implementation of a contact center channel merging system in accordance with an embodiment of the disclosure.

In terms of a general overview, certain embodiments described in this disclosure are directed to systems and methods for contact center channel merging. In an example method, a first inbound communication associated with a vehicle event may be received from a first vehicle component of a vehicle via a first communication medium, the first inbound communication including a first identifier. A second inbound communication associated with the vehicle event may be received from a second vehicle component of the vehicle via a second communication medium, the second inbound communication including a second identifier. It may be determined that a first time associated with the first inbound communication and a second time associated with the second inbound communication are within a predetermined threshold, and that the first identifier and the second identifier are both associated with the vehicle. At least one notification may be sent based in part on an aggregation of the first inbound communication and the second inbound communication.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. The word "device" may be any of various devices, such as, for example, a user device such as a smartphone or a tablet, a smart vehicle, and a computer. The word "sensor" may be any of various sensors that can be found in a scooter, such as cameras, radar sensors, Lidar sensors, and sound sensors.

It must also be understood that words such as "implementation," "scenario," "case," and "situation" as used herein are an abbreviated version of the phrase "in an example ("implementation," "scenario," "case," "approach," and "situation") in accordance with the disclosure." Furthermore, the word "example" as used herein is intended to be non-exclusionary and non-limiting in nature.

FIG. 1 illustrates an example implementation of a contact center channel merging system 100 in accordance with an embodiment of the disclosure. As depicted in FIG. 1, a first inbound communication 104 may be transmitted from a first vehicle 102 to a network(s) 106. In some embodiments, the first inbound communication 104 may be transmitted through the network(s) 106 from a first vehicle component of the first vehicle 102 when a vehicle event occurs at the first vehicle 102. As further depicted in FIG. 1, a second inbound communication 108 may be transmitted from the first vehicle 102 through the network(s) 106. In some embodiments, the second inbound communication 108 may be transmitted from the first vehicle 102 through the network(s) 106 from a second vehicle component of the first vehicle 102 when the vehicle event occurs at the first vehicle 102. In some embodiments, the vehicle events may refer to events occurring at specific components of the first vehicle 102. In some embodiments, the first inbound communication 104 may be transmitted via a first communication medium and the second inbound communication 108 may be transmitted via a second communication medium. The first communication medium and the second communication medium may include various methods of communication, such as transmission of signals from vehicle sensors, voice calls over a cellular network or other network, such as the network(s) 106. In some embodiments, the first communication medium and the second communication medium may be different.

The network(s) 106 may include any one, or a combination of networks, such as, for example, a local area network (LAN), a wide area network (WAN), a telephone network, a cellular network, a cable network, a wireless network, and/or private/public networks such as the Internet. In some embodiments, at least one portion of the network(s) 106 may include a wireless communication link (a WiFi link, a cellular link, a vehicle-to-everything (V2X) link, a vehicle-to-vehicle (V2V) link, etc.) that allows a vehicle to communicate with the contact center 110. In some embodiments, the inbound communications may be carried out via wireless signals either directly or via the network(s) 106 by use of any of various communication formats such as, for example, WiFi, cellular, TCP/IP, Bluetooth®, Ultra-Wideband, Wi-Fi, Ultra-Wideband (UBW), Zigbee®, and near-field-communications (NFC).

In some embodiments, a third inbound communication 105 may be transmitted from a second vehicle 103 through the network(s) 106. In some embodiments, the third inbound communication 105 may be transmitted through the network(s) 106 from a first vehicle component of the second vehicle 103 when a vehicle event occurs at the second vehicle 103. A fourth inbound communication 109 may be transmitted from the second vehicle 103 through the network(s) 106. In some embodiments, the fourth inbound communication 109 may be transmitted from the second vehicle 103 through the network(s) 106 from a second vehicle component of the second vehicle 103 when the vehicle event occurs at the second vehicle 103. In some embodiments, the vehicle events may refer to events occurring at specific components of the second vehicle 103. In some embodiments, the third inbound communication 105 may be transmitted via a third communication medium and the fourth inbound communication 109 may be transmitted via a fourth communication medium. The third communication medium and the fourth communication medium may include various methods of communication, such as transmission of signals from vehicle sensors, voice calls over a cellular network or other network, such as the network(s) 106. In some embodiments, the third communication medium and the fourth communication medium may be different.

In some embodiments, the vehicle event that triggers the transmission of the first inbound communication 104 may be separate and independent from the vehicle event that triggers the transmission of the second inbound communication 108. In some embodiments, although the vehicle event that triggers the transmission of the first inbound communication 104 may be different from the vehicle event that triggers the transmission of the second inbound communication 108, the first inbound communication 104 and the second inbound communication 108 may be associated with the same real-time event occurring at the first vehicle 102. In some embodiments, the first inbound communication 104 may be transmitted from a first vehicle component of the first vehicle 102 having a first identifier. In some embodiments, the second inbound communication 108 may be transmitted from a second vehicle component of the first vehicle 102 having a second identifier.

In some embodiments, the vehicle event that triggers the transmission of the third inbound communication 105 may be separate and independent from the vehicle event that triggers the transmission of the fourth inbound communication 109. In some embodiments, although the vehicle event that triggers the transmission of the third inbound communication 105 may be different from the vehicle event that triggers the transmission of the fourth inbound communication 109, the third inbound communication 105 and the fourth inbound communication 109 may be associated with the same real-time event occurring at the second vehicle 103. In some embodiments, the third inbound communication 105 may be transmitted from a first vehicle component of the second vehicle 103 having a third identifier. In some embodiments, the fourth inbound communication 109 may be transmitted from a second vehicle component of the second vehicle 103 having a fourth identifier.

In some embodiments, the first component and the second component of the first vehicle 102 may include sensors at the first vehicle 102, physical components of the first vehicle 102, and/or communications devices at the first vehicle 102, including vehicle alert systems, live chat systems, electronic messaging systems, and voice calling systems. In some embodiments, the first inbound communication 104 may be automatically sent when the first component of the first vehicle 102 is activated in response to the vehicle event. In some embodiments, the second inbound communication 108 may be automatically sent when the second component of the first vehicle 102 is activated in response to the vehicle event.

In some embodiments, the first component and the second component of the second vehicle 103 may include sensors at the second vehicle 103, physical components of the second vehicle 103, and/or communications devices at the second vehicle 103, including vehicle alert systems, live chat systems, electronic messaging systems, and voice calling systems. In some embodiments, the third inbound communication 105 may be automatically sent when the first component of the second vehicle 103 is activated in response to the vehicle event. In some embodiments, the fourth inbound communication 109 may be automatically sent when the second component of the second vehicle 103 is activated in response to the vehicle event.

As an example, an inbound communication may be transmitted via a voice call from the first vehicle 102 through the network(s) 106. The voice call may have been initiated because of a vehicle event that occurred, such as the user of the first vehicle 102 pressing a button at a human machine interface of the first vehicle 102 to initiate the call. The voice call may be sent to the network(s) 106 through a voice call channel utilizing a cellular network. As another example, a sensor of the first vehicle 102 that is activated based on a vehicle event occurring may also initiate the transmission of an inbound communication through the network(s) 106. This inbound communication may be transmitted through the network(s) 106 via an alert channel through a cloud. In some embodiments, the user of the first vehicle 102 may have pressed the button to initiate the voice call to seek assistance with the first vehicle 102, and the assistance may be requested because of the activation of the sensor of the first vehicle 102.

In another example, the first vehicle 102 may have collided with another vehicle. The first vehicle 102 may deploy its airbags. The first vehicle 102 may thus automatically use a gateway module to send a collision alert to the cloud and through the network(s) 106. At around the same time, the first vehicle 102 may further initiate a voice call through a cellular network to the network(s) 106.

In some embodiments, the first inbound communication 104, the second inbound communication 108, the third inbound communication 105, and the fourth inbound communication 109 may be routed through the network(s) 106 to a contact center 110. At the contact center 110, the first inbound communication 104, the second inbound communication 108, the third inbound communication 105, and the fourth inbound communication 109 may be analyzed. The first inbound communication 104 may include the first identifier, which may be associated with the first vehicle 102. The second inbound communication 108 may include the second identifier, which may also be associated with the first vehicle 102. In some embodiments, the first identifier and the second identifier may be a vehicle identification number (VIN), a license plate number, a correlation identification, and/or another unique vehicle identifier associated with the first vehicle 102.

The third inbound communication 105 may include the third identifier, which may be associated with the second vehicle 103. The fourth inbound communication 109 may include the fourth identifier, which may also be associated with the second vehicle 103. In some embodiments, the third identifier and the fourth identifier may be a vehicle identification number (VIN), a license plate number, a correlation identification, and/or another unique vehicle identifier associated with the second vehicle 103.

In some embodiments, the first inbound communication 104, the second inbound communication 108, the third inbound communication 105, and the fourth inbound communication 109 may be transmitted to a contact center 110. In some embodiments, it may be determined at the contact center 110 that the first identifier for the first inbound communication 104 and the second identifier for the second inbound communication 108 are both associated with the first vehicle 102. In some embodiments, the network(s) 106 may determine that the first inbound communication 104 and the second inbound communication 108 are associated with the same real-time event occurring at the first vehicle 102 because both the first identifier and the second identifier are associated with the first vehicle 102. In some embodiments involving electronic messages and/or voice calls, the first identifier and/or the second identifier may be included in the data payload associated with the electronic messages and/or voice calls. In some embodiments, it may be further determined that a first time associated with the first inbound communication 104 and a second time associated with the second inbound communication 108 were within a predetermined threshold. For example, the second inbound communication 108 may have been received within a predetermined number of minutes of receipt of the first inbound communication 104. In some embodiments, the first time may be associated with one of a timestamp included in the first inbound communication 104 or a received time of the first inbound communication 104 by the contact center 110. In some embodiments, the second time may be associated with one of a timestamp included in the second inbound communication 108 or a received time of the second inbound communication 108 by the contact center 110. In some embodiments, the contact center 110 may determine that the first inbound communication 104 and the second inbound communication 108 are associated with the same real-time event occurring at the first vehicle 102 because the first time and the second time are received within a predetermined threshold.

In some embodiments, it may be determined at the contact center 110 that the third identifier for the third inbound communication 105 and the fourth identifier for the fourth inbound communication 109 are both associated with the second vehicle 103. In some embodiments, the contact center 110 may determine that the third inbound communication 105 and the fourth inbound communication 109 are associated with the same real-time event occurring at the second vehicle 103 because both the third identifier and the fourth identifier are associated with the second vehicle 103. In some embodiments involving electronic messages and/or voice calls, the third identifier and/or the fourth identifier may be included in the data payload associated with the electronic messages and/or voice calls. In some embodiments, it may be further determined that a third time associated with the third inbound communication 105 and a fourth time associated with the fourth inbound communication 109 were within a predetermined threshold. For example, the third inbound communication 105 may have been received within a predetermined number of minutes of receipt of the fourth inbound communication 109. In some embodiments, the third time may be associated with one of a timestamp included in the third inbound communication 105 or a received time of the third inbound communication 105 by the contact center 110. In some embodiments, the fourth time may be associated with one of a timestamp included in the fourth inbound communication 109 or a received time of the fourth inbound communication 109 by the contact center 110. In some embodiments, the contact center 110 may determine that the third inbound communication 105 and the fourth inbound communication 109 are associated with the same real-time event occurring at the second vehicle 103 because the third time and the fourth time are received within a predetermined threshold.

In some embodiments, the first inbound communication 104 and the second inbound communication 108 may be aggregated if the first identifier and the second identifier are determined to be both associated with the first vehicle 102 and if the first time associated with the first inbound communication 104 and the second time associated with the second inbound communication 108 are within a predetermined threshold. In some embodiments, at least one notification 112 may be determined based at least in part on the aggregation of the first inbound communication 104 and the second inbound communication 108. In some embodiments, the at least one notification 112 may be sent based at least in part on the aggregation of the first inbound communication 104 and the second inbound communication 108. In some embodiments, the at least one notification 112 may be sent based at least in part on a predetermined set of routing rules, which may be implemented to guide the routing of notifications to the appropriate recipients 114. The at least one notification 112 may then be transmitted to the appropriate recipients 114. In some embodiments, more than one notification 112 may be generated so that each appropriate recipient 114 may receive an individual notification 112. In some embodiments, the appropriate recipient 114 may include one or more of assistance providers, partners that may require notifications associated with certain alerts, and other appropriate recipients.

In some embodiments, the third inbound communication 105 and the fourth inbound communication 109 may be aggregated if the third identifier and the fourth identifier are determined to be both associated with the second vehicle 103 and if the third time associated with the third inbound communication 105 and the fourth time associated with the fourth inbound communication 109 are within a predetermined threshold. In some embodiments, at least one notification 113 may be determined based at least in part on the aggregation of the third inbound communication 105 and the fourth inbound communication 109. In some embodiments, the at least one notification 113 may be sent based at least in part on the aggregation of the third inbound communication 105 and the fourth inbound communication 109. In some embodiments, the at least one notification 113 may be sent based at least in part on a predetermined set of routing rules, which may be implemented to guide the routing of notifications to the appropriate recipients 115. The at least one notification 113 may then be transmitted to the appropriate recipients 115. In some embodiments, more than one notification 113 may be generated so that each appropriate recipient 115 may receive an individual notification 113. In some embodiments, the appropriate recipient 115 may include one or more of assistance providers, partners that may require notifications associated with certain alerts, and other appropriate recipients.

Figure 2:
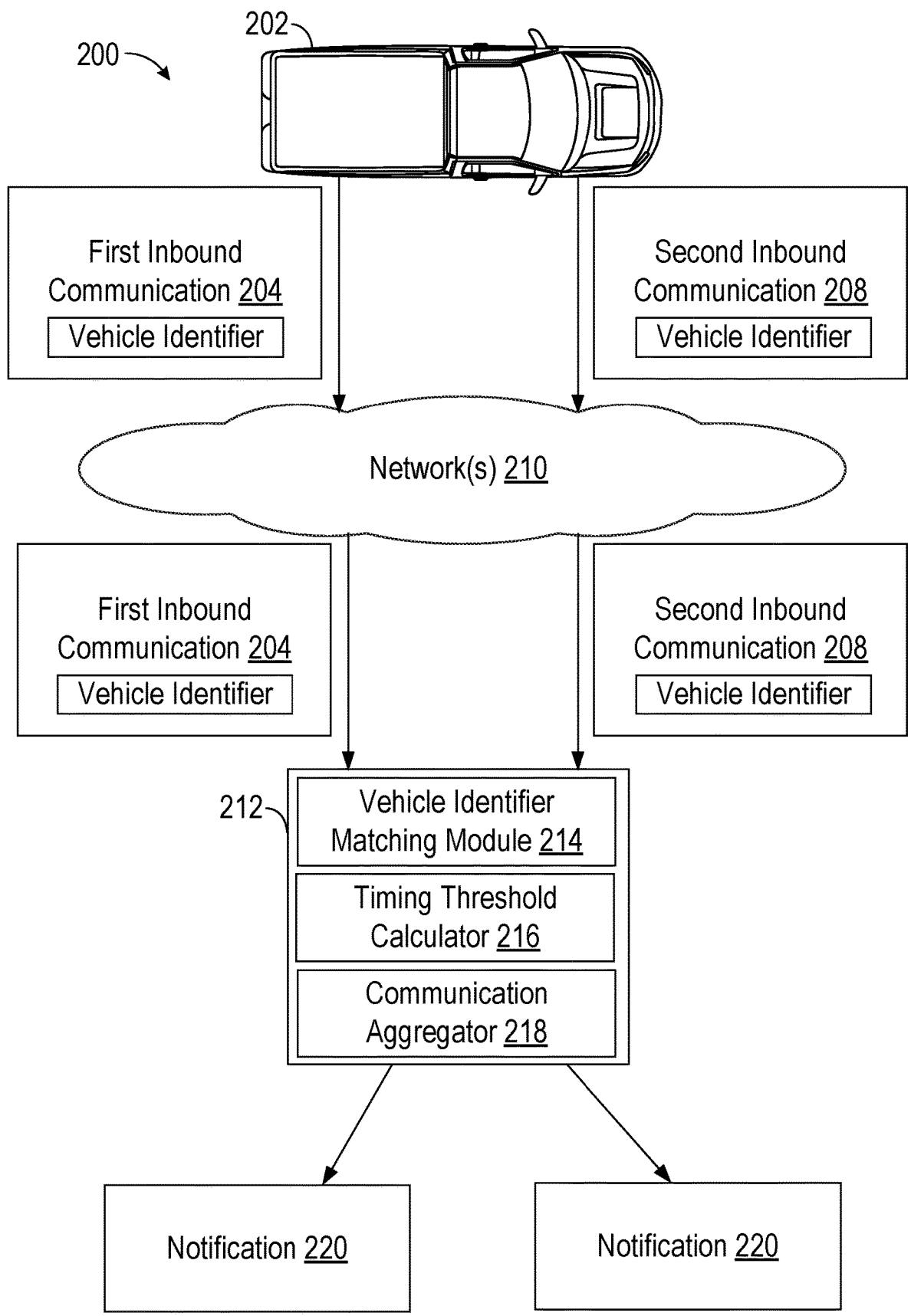
FIG. 2 illustrates an example implementation of a contact center channel merging system in accordance with an embodiment of the disclosure.

FIG. 2 illustrates an example implementation of a contact center channel merging system 200 in accordance with an embodiment of the disclosure. In some embodiments, a first inbound communication 204 having a first vehicle identifier and a second inbound communication 208 having a second vehicle identifier may be routed from a vehicle 202 through a network(s) 210. It should be noted that more than two inbound communications may be routed through the network(s) 210. For example, a third inbound communication having a third vehicle identifier may also be routed through the network(s) 210 from the vehicle 202.

The network(s) 210 may include any one, or a combination of networks, such as, for example, a local area network (LAN), a wide area network (WAN), a telephone network, a cellular network, a cable network, a wireless network, and/or private/public networks such as the Internet. In some embodiments, at least one portion of the network(s) 210 may include a wireless communication link (a WiFi link, a cellular link, a vehicle-to-everything (V2X) link, a vehicle-to-vehicle (V2V) link, etc.) that allows a vehicle to communicate, such as with the contact center 110 depicted in FIG. 1. In some embodiments, the inbound communications may be carried out via wireless signals either directly or via the network(s) 210 by use of any of various communication formats such as, for example, WiFi, cellular, TCP/IP, Bluetooth®, Ultra-Wideband, Wi-Fi, Ultra-Wideband (UBW), Zigbee®, and near-field-communications (NFC).

In some embodiments, the first inbound communication 204 may be transmitted via a first communication medium, and the second inbound communication 208 may be transmitted via a second communication medium. In some embodiments, the first inbound communication 204 and/or the second inbound communication 208 may be routed through a vehicle gateway, through a cloud and/or network, and to a contact center backend. In other embodiments, the first inbound communication 204 and/or the second inbound communication 208 may be routed through a cellular network or a Voice over Internet Phone (VoIP) network to the contact center backend. In some embodiments, the contact center backend may be a system that receives various inbound communications from various channels and may include a server for performing various data orchestrations. In some embodiments, the first inbound communication 204 and/or the second inbound communication 208 may be in the form of an alert, a signal, a notification, a message, a phone call, or any other form of communication.

In some embodiments, the first inbound communication 204 may include the first vehicle identifier when the contact center backend receives the first inbound communication 204, and the second inbound communication 208 may include the second vehicle identifier when the contact center backend receives the second inbound communication 208. For example, each vehicle identifier may be included in each inbound communication's data payload and/or data packets. In some embodiments, the contact center backend may add the first vehicle identifier to the first inbound communication 204 upon receipt of the first inbound communication 204, and the contact center backend may add the second vehicle identifier to the second inbound communication 208 upon receipt of the second inbound communication 208. In some embodiments, each vehicle identifier may include a VIN, a license plate number, or an identification correlation.

In some embodiments, when the network(s) 210 receives the first inbound communication 204 and the second inbound communication 208, the network(s) 210 may direct the first inbound communication 204 and the second inbound communication 208 to a processor 212, which may be used to analyze the first inbound communication 204 and the second inbound communication 208. The processor 212 may include a vehicle identifier matching module 214, a timing threshold calculator 216, and a communication aggregator 218. In some embodiments, the vehicle identifier matching module 214 may identify whether the first vehicle identifier associated with the first inbound communication 204 and the second vehicle identifier associated with the second inbound communication 208 are associated with the same vehicle. In some embodiments, the timing threshold calculator 216 may determine whether a first time associated with the first inbound communication 204 and a second time associated with the second inbound communication 208 are within a predetermined threshold. If the first vehicle identifier and the second vehicle identifier are associated with the same vehicle, and if the first time and the second time are within a predetermined threshold, the processor 212 may identify the first inbound communication 204 and the second inbound communication 208 as an aggregate communication. The processor 212 may further determine that the first inbound communication 204 and the second inbound communication 208 are related to the same real-time event occurring at the vehicle. In some embodiments, if the first time and the second time are not within a predetermined threshold, the first inbound communication 204 and the second inbound communication may be treated as independent events.

In some embodiments, the communication aggregator 218 may aggregate the first inbound communication 204 and the second inbound communication 208 if the first vehicle identifier and the second vehicle identifier are associated with the same vehicle, and if the first inbound time and the second time are within a predetermined threshold. In some embodiments, the communication aggregator 218 may send at least one notification 220 based on the aggregation of the first inbound communication 204 and the second inbound communication 208. In some embodiments, the communication aggregator 218 may be further configured to determine appropriate recipients associated with the at least one notification 220. In some embodiments, the at least one notification 220 may be sent further based on a set of predetermined business rules that determine the appropriate recipient of the at least one notification 220. In some embodiments, the at least one notification 220 may be tagged by the communication aggregator 218 for appropriate routing at a contact center frontend. In such an embodiment, the contact center frontend may route the at least one notification 220 to the appropriate recipient.

In some alternative embodiments, the first inbound communication 204 and/or the second inbound communication 208 may be received at a contact center frontend after the contact center backend has processed the first inbound communication 204 and/or the second inbound communication 208 and added a unique vehicle identifier to each inbound communication. In some embodiments, the contact center frontend may include a system used by contact center personnel to receive and manage inbound communications from various channels. In some embodiments, if the first inbound communication 204 is received at the contact center frontend, and the first inbound communication 204 is of such a nature that the second inbound communication 208 should be subsequently expected, the contact center frontend may be configured to wait for the second inbound communication 208 following receipt of the first inbound communication 204. In some instances, the contact center frontend may be configured to wait for a predetermined amount of time for the second inbound communication 208 following receipt of the first inbound communication 204. In such an embodiment, the matching of the second vehicle identifier associated with the second inbound communication 208 and the first vehicle identifier associated with the first inbound communication 204 may be performed at the contact center frontend.

In some embodiments, the contact center frontend may receive the first inbound communication 204 and route the first inbound communication 204 to the appropriate recipient. The contact center frontend may then maintain an alert database including the appropriate recipient, the first identifier, which is associated with a vehicle, and the other vehicle identifiers associated with the vehicle. The alert database may be configured to store the appropriate recipients associated with each of the vehicle identifiers associated with the vehicle. Thus, when the second inbound communication 208 is received at the contact center frontend, the contact center frontend utilizes the alert database to determine the appropriate recipient of the second inbound communication 208. In some instances, when the second inbound communication 208 having the second vehicle identifier is received, the contact center frontend may request a match between the second vehicle identifier and the database in order to determine that the second inbound communication 208 was transmitted from the same vehicle as the first inbound communication 204, and that the second inbound communication 208 should be routed to the recipients who also received the first inbound communication 204.

Figure 3:
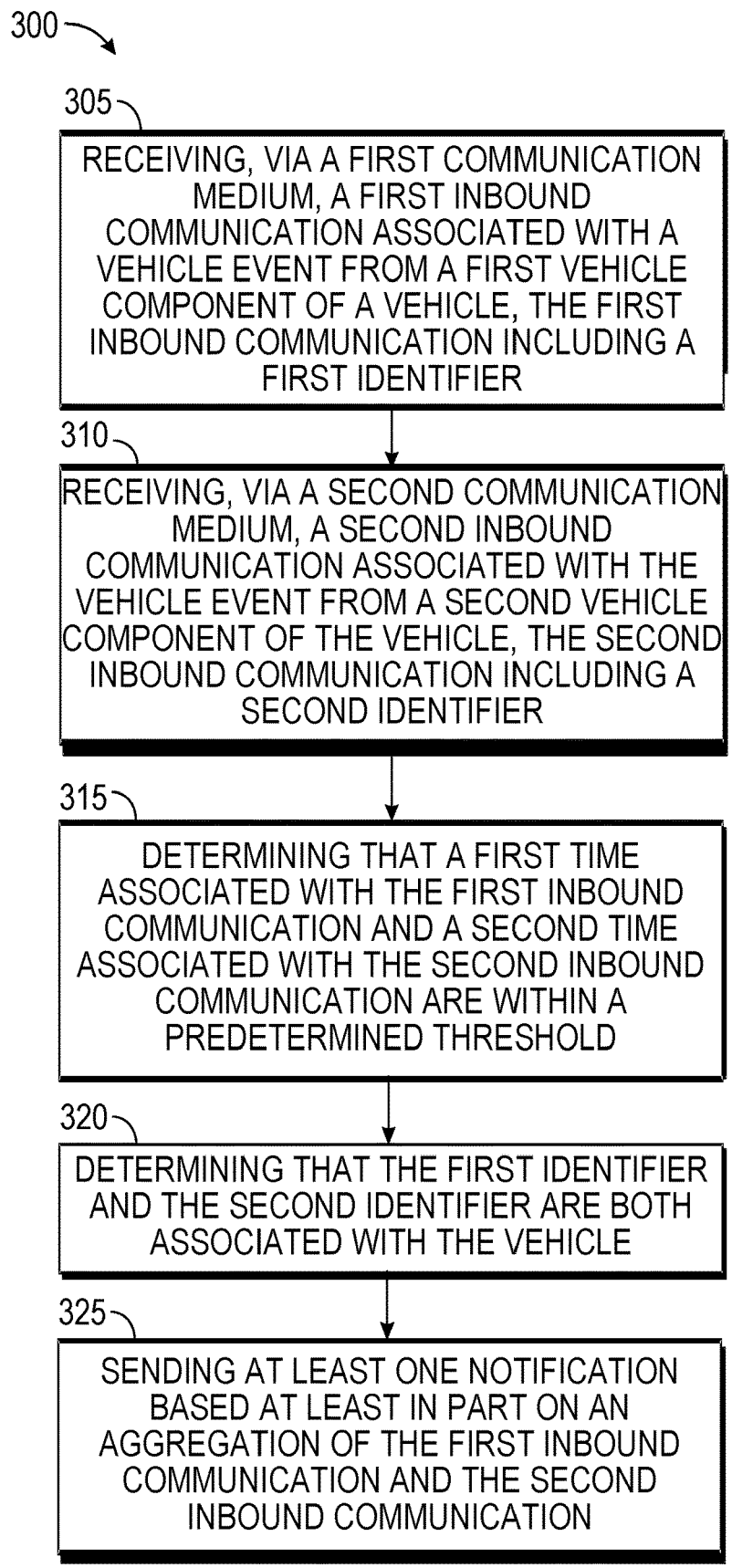
FIG. 3 depicts a flow chart of an example method for contact center channel merging in accordance with the disclosure.

FIG. 3 shows a flow chart 300 of an example method of contact center channel merging in accordance with the disclosure. The flow chart 300 illustrates a sequence of operations that can be implemented in hardware, software, or a combination thereof. In the context of software, the operations represent computer-executable instructions stored on one or more non-transitory computer-readable media such as a memory provided in a scooter computer, that, when executed by one or more processors such as the processor provided in the scooter computer, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flow chart 300 may be carried out at a contact center and/or a server either independently or in cooperation with other devices such as, for example, various vehicle components capable of transmitting communications and cloud elements (such as, for example, a computer or cloud storage).

At block 305, a first inbound communication associated with a vehicle event may be received from a first vehicle component of a vehicle via a first communication medium. The first inbound communication may include a first identifier. In some embodiments, the first inbound communication may be automatically sent by the first vehicle component in response to the vehicle event.

At block 310, a second inbound communication associated with the vehicle event may be received from a second vehicle component of the vehicle via a second communication medium. The second inbound communication may include a second identifier. In some embodiments, the first communication medium and the second communication medium may be different. In some embodiments, the second inbound communication may be automatically sent by the second vehicle component in response to the vehicle event.

At block 315, it may be determined that a first time associated with the first inbound communication and a second time associated with the second inbound communication are within a predetermined threshold. In some embodiments, the first time may be associated with one of a first timestamp included in the first inbound communication or a first received time of the first inbound communication by a contact center. In some embodiments, the second time may be associated with one of a second timestamp included in the second inbound communication or a second received time of the second inbound communication by a contact center.

At block 320, the first identifier and the second identifier may be determined to both be associated with the vehicle. In some embodiments, the first identifier and the second identifier may comprise at least one of a vehicle identification number (VIN), a license plate number, or a correlation identification.

At block 325, at least one notification may be sent based at least in part on an aggregation of the first inbound communication and the second inbound communication. In some embodiments, the at least one notification may be sent based in part on a predetermined set of rules.

Figure 4:
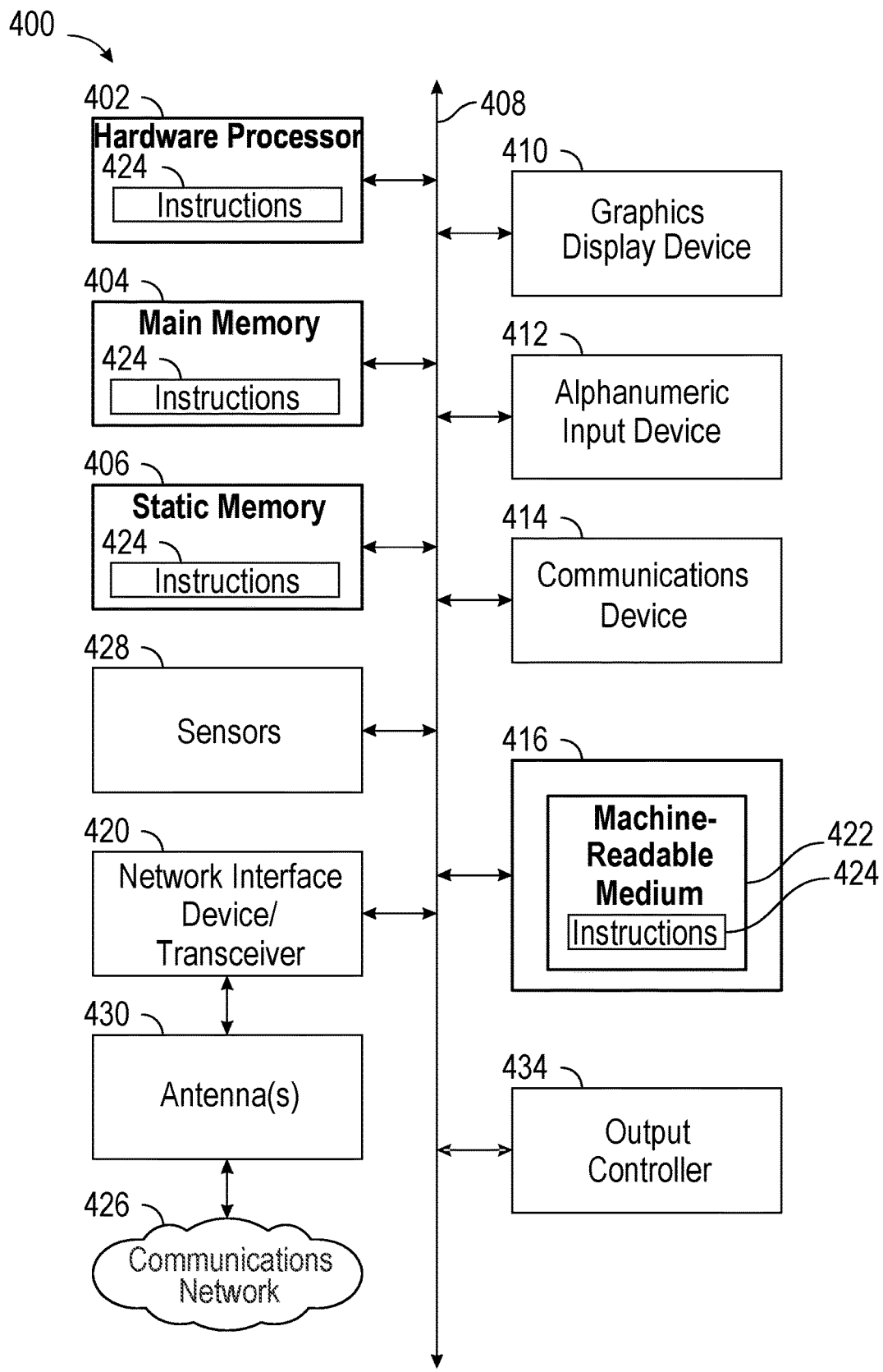
FIG. 4 depicts a block diagram of an example machine upon which any of one or more techniques (e.g., methods) may be performed, in accordance with an embodiment of the disclosure.

FIG. 4 depicts a block diagram of an example machine 400 upon which any of one or more techniques (e.g., methods) may be performed, in accordance with one or more example embodiments of the present disclosure. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a graphics display device 410, an alphanumeric input device 412 (e.g., a keyboard), and a communications device 414. In an example, the graphics display device 410, the alphanumeric input device 412, and the communications device 414 may be a touch screen display. The machine 400 may additionally include a storage device (i.e., drive unit) 416, a network interface device/transceiver 420 coupled to antenna(s) 430, and one or more sensors 428, such as a global positioning system (GPS) sensor, a compass, an accelerometer, or other sensor. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 416 may include a machine-readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee®, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey the information that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
receiving, via a first communication medium, a first inbound communication associated with a vehicle event from a first vehicle component of a vehicle, the first inbound communication including a first identifier;
receiving, via a second communication medium, a second inbound communication associated with the vehicle event from a second vehicle component of the vehicle, the second inbound communication including a second identifier;
determining that a first time associated with the first inbound communication and a second time associated with the second inbound communication are within a predetermined threshold;
determining that the first identifier and the second identifier are both associated with the vehicle; and
sending at least one notification based at least in part on an aggregation of the first inbound communication and the second inbound communication.

2. The method of claim 1, wherein the first identifier and the second identifier comprise at least one of: a vehicle identification number (VIN), a license plate number, or a correlation identification.

3. The method of claim 1, wherein the first time is associated with one of a first timestamp included in the first inbound communication or a first received time of the first inbound communication by a contact center.

4. The method of claim 3, wherein the second time is associated with one of a second timestamp included in the second inbound communication or a second received time of the second inbound communication by the contact center.

5. The method of claim 1, further comprising:
sending the at least one notification based on a predetermined set of rules.

6. The method of claim 1, wherein the first communication medium and the second communication medium are different.

7. The method of claim 6, wherein the first inbound communication is automatically sent by the first vehicle component in response to the vehicle event, and wherein the second inbound communication is automatically sent by the second vehicle component in response to the vehicle event.

8. A device, comprising:
at least one memory device that stores computer-executable instructions; and
at least one processor configured to access the at least one memory device, wherein the at least one processor is configured to execute the computer-executable instructions to:
receive, via a first communication medium, a first inbound communication associated with a vehicle event from a first vehicle component of a vehicle, the first inbound communication including a first identifier;
receive, via a second communication medium, a second inbound communication associated with the vehicle event from a second vehicle component of the vehicle, the second inbound communication including a second identifier;

determine that a first time associated with the first inbound communication and a second time associated with the second inbound communication are within a predetermined threshold;

determine that the first identifier and the second identifier are both associated with the vehicle; and send at least one notification based at least in part on an aggregation of the first inbound communication and the second inbound communication.

9. The device of claim 8, wherein the first identifier and the second identifier comprise at least one of: a vehicle identification number (VIN), a license plate number, or a correlation identification.

10. The device of claim 8, wherein the first time is associated with one of a first timestamp included in the first inbound communication or a first received time of the first inbound communication by a contact center.

11. The device of claim 10, wherein the second time is associated with one of a second timestamp included in the second inbound communication or a second received time of the second inbound communication by the contact center.

12. The device of claim 8, further comprising:
sending the at least one notification based on a predetermined set of rules.

13. The device of claim 8, wherein the first communication medium and the second communication medium are different.

14. The device of claim 13, wherein the first inbound communication is automatically sent by the first vehicle component in response to the vehicle event, and wherein the second inbound communication is automatically sent by the second vehicle component in response to the vehicle event.

15. A non-transitory computer-readable medium storing computer-executable instructions which, when executed by a processor, cause the processor to perform operations comprising:

receiving, via a first communication medium, a first inbound communication associated with a vehicle event from a first vehicle component of a vehicle, the first inbound communication including a first identifier;

receiving, via a second communication medium, a second inbound communication associated with the vehicle event from a second vehicle component of the vehicle, the second inbound communication including a second identifier;

determining that a first time associated with the first inbound communication and a second time associated with the second inbound communication are within a predetermined threshold;

determining that the first identifier and the second identifier are both associated with the vehicle; and sending at least one notification based at least in part on an aggregation of the first inbound communication and the second inbound communication.

16. The non-transitory computer-readable medium of claim 15, wherein the first identifier and the second identifier comprise at least one of: a vehicle identification number (VIN), a license plate number, or a correlation identification.

17. The non-transitory computer-readable medium of claim 15, wherein the first time is associated with one of a first timestamp included in the first inbound communication or a first received time of the first inbound communication by a contact center.

18. The non-transitory computer-readable medium of claim 17, wherein the second time is associated with one of a second timestamp included in the second inbound communication or a second received time of the second inbound communication by the contact center.

19. The non-transitory computer-readable medium of claim 15, wherein the first communication medium and the second communication medium are different.

20. The non-transitory computer-readable medium of claim 19, wherein the first inbound communication is automatically sent by the first vehicle component in response to the vehicle event, and wherein the second inbound communication is automatically sent by the second vehicle component in response to the vehicle event.

* * * * *